United States Patent [19]

Kurata et al.

[11] 4,017,089
[45] Apr. 12, 1977

[54] SEALING DEVICE FOR HYDRAULICALLY OR PNEUMATICALLY OPERATED EQUIPMENT

[75] Inventors: Masayuki Kurata; Yusiyo Watanabe, both of Iwatsuki, Japan

[73] Assignee: Akebono Brake Industry Co., Ltd., Tokyo, Japan

[22] Filed: July 29, 1975

[21] Appl. No.: 600,010

[52] U.S. Cl. .......................... 277/152; 277/212 FB
[51] Int. Cl.² .......................................... F10J 15/24
[58] Field of Search .......... 277/152, 153, 200, 214, 277/212 FB, 237 A, 58, 205, 165; 64/32

[56] References Cited

UNITED STATES PATENTS

| | | | |
|---|---|---|---|
| 2,974,501 | 3/1961 | Kaufman et al. | 277/205 |
| 3,331,609 | 7/1967 | Moran | 277/165 |
| 3,362,719 | 1/1968 | McCormick | 277/153 |
| 3,494,625 | 2/1970 | Sweger | 277/237 A |

*Primary Examiner*—Robert I. Smith
*Attorney, Agent, or Firm*—Toren, McGeady and Stanger

[57] ABSTRACT

A sealing boot for hydraulically or pneumatically operated equipments comprising an external portion which is pressed by a resilient ring into fitted engagement with a circumferential groove provided in a cylinder body, an internal portion which is tightly attached to the outer edge of a piston and a flexible portion which connects said external portion to said internal portion, the external portion being provided with a recess which is arranged in the direction of the width of the external portion to form a continuous curve.

6 Claims, 4 Drawing Figures

FIG.1
FIG.3
FIG.2
FIG.4
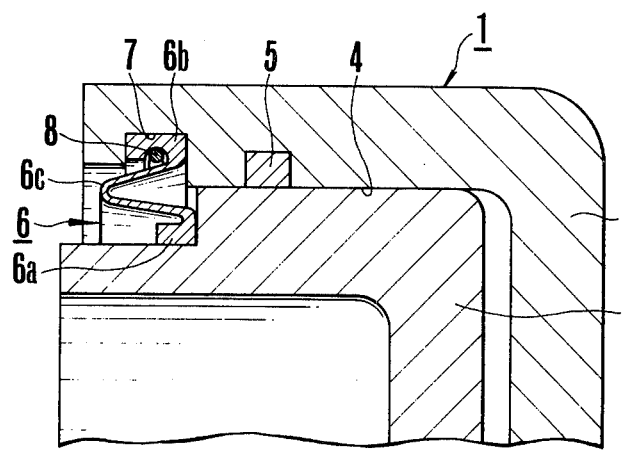
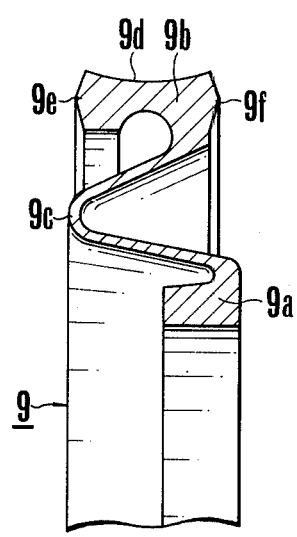
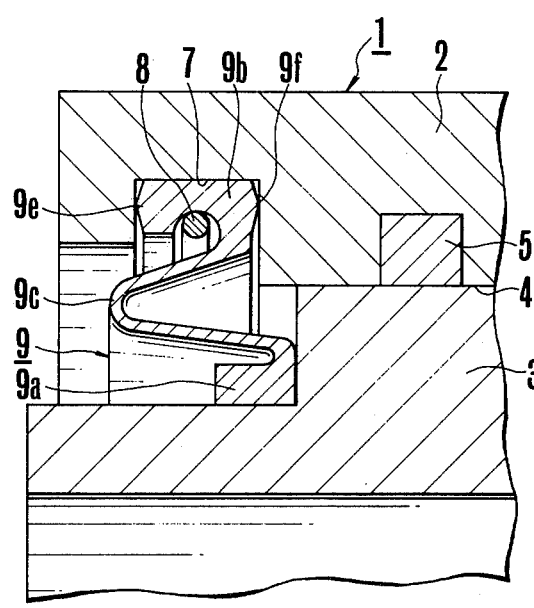
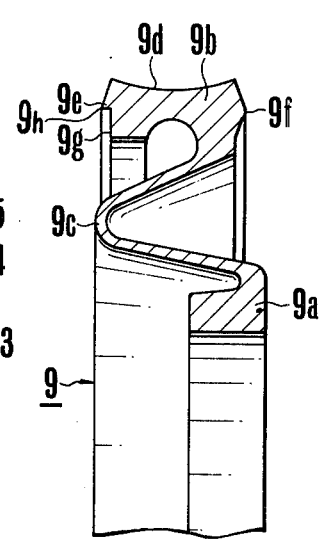

SEALING DEVICE FOR HYDRAULICALLY OR PNEUMATICALLY OPERATED EQUIPMENT

SUMMARY OF THE INVENTION

This invention relates to a boot which prevents muddy water, dust, etc. from outside from entering a sliding part between a piston and a cylinder in a hydraulically or pneumatically operated equipment. It is the principal object of this invention to provide a boot of a shape which ensures an improved sealing effect.

BRIEF DESCRIPTION OF THE DRAWINGS

FIG. 1 is a sectional view illustrating a part of a hydraulically or pneumatically operated equipment with a conventional boot mounted thereon.

FIG. 2 is a sectional view illustrating a boot prepared in accordance with this invention as being in a mounted position and FIG. 3 a sectional view illustrating the same boot of this invention as in a free, unmounted condition.

FIG. 4 is a sectional view illustrating a modification of the boot shown in FIG. 3. In these drawings, reference numberals indicates parts as shown below:

1: Hydraulically or pneumatically operated equipment
2: Cylinder body
3: Piston
4: Cylinder
5: Seal
6 and 9: Boot
7: Circumferential groove
8: Resilient ring
6a and 9a: Internal thick portion
6b and 9b: External thick portion
6c and 9c: Flexible portion
9d: Recess
9e and 9f: Protrusion In comparison with the boot prepared in accordance with this invention as illustrated in FIGS. 2, 3 and 4, the conventional boot which is represented by FIG. 1 is first described as follows:

DESCRIPTION OF THE PRIOR ART

In FIG. 1 which illustrates the conventional boot, a cylinder body 2 of a hydraulically or pneumatically operated equipment 1 is provided with cylinder 4 in which a piston 3 is fitted. A seal 5 is arranged to prevent a pressurized hydraulic oil or air from leaking. A boot 6 which is arranged to prevent muddy water etc. from entering a sliding part between the piston and the cylinder from outside is made of a resilient material and comprises an internal thick portion 6a, an external thick portion 6b and a flexible portion 6c with the flexible portion 6c being disposed to connect the thick portions 6a and 6b. The internal thick portion 6a receives stress in the direction of its circumference and is pressed tightly against the outer edge of the piston 3 to give a sufficient sealing effect. On the other hand, the external thick portion 6b is fitted in a circumferential groove 7 of a rectangular shape provided in the inner edge of the cylinder body 2 with stress applied by a resilient ring 8 to the external thick portion 6b from the inner circumference of it toward the circumference thereof. However, in the surface pressure distribution in the external thick portion 6b of the boot 6 at the bottom of the groove 7, the pressure is high only in the middle part which corresponds to the resilient ring 8 and is low at both ends. Furthermore, since the width of the groove 7 of the external thick portion 6b is somewhat less than that of the groove 7, there is almost no surface pressure at both sides of the external thick portion 6b. Thus, in the conventional boot 6, the external thick portion 6b is pressed only at the part which is pushed by the resilient ring 8. Therefore, the sealing effect attained with the conventional boot has been insufficient.

DESCRIPTION OF PREFERRED EMBODIMENT

FIG. 2 illustrates a boot 9 which is prepared in accordance with this invention as being applied to an equipment while FIG. 3 illustrates it as in a free, unmounted condition.

In the peripheral part of an external thick portion 9b, there are provided a recess 9d in the direction of the width, the recess 9d forming an annularly continuous curve and forming either protrusions 9e and 9f on both sides of the external thick portion 9b or a protrusion on one side only. The width of the external thick portion 9b at the protrudent part is arranged to be greater than a groove 7 disposed in the body of the equipment to correspond to the external thick portion. As shown in FIG. 2, the recess 9d of the boot 9 is pushed by a resilient ring 8 against the bottom of the groove 7 of the body and is thus kept in close contact with the bottom with its recessed shape resiliently flattened out by the force of the ring 8. This ensures that the surface pressure at both edges of the recessed side of the external thick portion is greater than the conventional boot. In addition to that, the protrusions 9e and 9f also come into resilient contact with the sides of the groove 7 of the body 2 to ensure an enhanced sealing effect.

FIG. 4 illustrates a modification of the boot shown in FIG. 3. In this modification, in the external part thereof the protrudent side of the external thick portion 9b which is to be brought into contact with the side wall of the circumferential groove of the cylinder body is provided with a cutaway part 9g which is cut in the lower part of the side 9e either at a right angle to or at a smaller angle 9h in respect to the side 9e. This arrangement further enhances the sealing effect.

What is claimed is:

1. A sealing device for hydraulically or pneumatically operated equipment comprising:
   a cylinder body;
   a piston fitted into said cylinder body;
   a circumferential groove provided in said cylinder body, the groove being formed by a pair of confronting walls and a circumferential face forming a bottom for said groove;
   a boot which is composed of an internal portion tightly attached to the outer edge of said piston, an external portion having a recess which forms a continuous curvature in the direction of the width of the external portion, and a flexible portion which connects said external portion to said internal portion; and
   a resilient ring which presses said external portion of said boot into fitted engagement with said circumferential groove and against said bottom thereof.

2. A sealing device according to claim 1 wherein said external portion of said boot is flattened by said resilient ring with the external portion being pressed against the bottom of said circumferential groove provided in said cylinder body.

3. A sealing device according to claim 2 wherein there are provided protrusions on both sides of the external portion of said boot in such a manner as to engage with the confronting walls of said groove, the protrusions of the boot being dimensioned to form said external portion with a width dimension extending from one of said protrusions to the other of said protrusions, measured when said external portion is not inserted in said groove, which is greater than the width dimension of said groove.

4. A sealing device according to claim 3 wherein the external portion of said boot is provided with a cutaway part in the lower side portion thereof.

5. A sealing device according to claim 3 wherein said cutaway part is cut to extend perpendicularly to the side face of said external portion.

6. A sealing device according to claim 3 wherein said cutaway part is cut to extend at an acute angle to the side face of the external portion.

* * * * *